US009032212B1

(12) United States Patent
Juels

(10) Patent No.: US 9,032,212 B1
(45) Date of Patent: May 12, 2015

(54) SELF-REFRESHING DISTRIBUTED CRYPTOGRAPHY

(71) Applicant: EMC Corporation, Hopkinton, MA (US)

(72) Inventor: Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 77 days.

(21) Appl. No.: 13/840,654

(22) Filed: Mar. 15, 2013

(51) Int. Cl.
*H04L 29/06* (2006.01)
*H04L 9/32* (2006.01)

(52) U.S. Cl.
CPC ............ *H04L 9/3271* (2013.01); *H04L 9/3228* (2013.01); *H04L 63/068* (2013.01)

(58) Field of Classification Search
CPC .... H04L 9/3271; H04L 9/3228; H04L 63/068
See application file for complete search history.

(56) References Cited

U.S. PATENT DOCUMENTS

| 7,139,917 | B2 * | 11/2006 | Jablon | 713/183 |
|---|---|---|---|---|
| 7,360,238 | B2 * | 4/2008 | Owlett | 726/2 |
| 7,690,026 | B2 * | 3/2010 | Zhu et al. | 726/8 |
| 7,694,329 | B2 * | 4/2010 | McGarvey et al. | 726/8 |
| 7,958,347 | B1 * | 6/2011 | Ferguson | 713/155 |
| 8,522,025 | B2 * | 8/2013 | Lakshmeshwar et al. | 713/170 |
| 8,667,285 | B2 * | 3/2014 | Coulier et al. | 713/171 |
| 8,775,794 | B2 * | 7/2014 | Benson | 713/155 |
| 8,782,752 | B1 * | 7/2014 | Juels et al. | 726/4 |
| 2002/0116611 | A1 * | 8/2002 | Zhou et al. | 713/156 |
| 2003/0163737 | A1 * | 8/2003 | Roskind | 713/201 |
| 2003/0221102 | A1 * | 11/2003 | Jakobsson et al. | 713/171 |
| 2003/0229788 | A1 * | 12/2003 | Jakobsson et al. | 713/171 |
| 2003/0233584 | A1 * | 12/2003 | Douceur | 713/202 |
| 2005/0010774 | A1 * | 1/2005 | Rose et al. | 713/171 |
| 2009/0217386 | A1 * | 8/2009 | Schneider | 726/30 |
| 2011/0116381 | A1 * | 5/2011 | Nikander et al. | 370/236 |
| 2013/0291056 | A1 * | 10/2013 | Gaudet et al. | 726/1 |

OTHER PUBLICATIONS

Yang, Yatao; Gu, Yonghao; Tan, Xi; Ma, Lina; "A New Wireless Mesh Network Authentication Scheme Based on Threshold Method", The $9^{th}$ International Conference for Young Computer Scientists, Nov. 18-21, 2008, IEEE, pp. 2260-2265.*

(Continued)

*Primary Examiner* — Victor Lesniewski
(74) *Attorney, Agent, or Firm* — Ryan, Mason & Lewis, LLP

(57) ABSTRACT

In one embodiment, a set of servers generates at least one challenge that is sent to a client. The servers receive from the client a response that includes a message generated as a function of the challenge. The response also includes a digital signature computed on the message using a secret key of a key pair generated for a current epoch. The client is authenticated based on indications from respective ones of the servers as to whether or not the received response is accepted as valid by that server. Other embodiments involve interaction between a set of servers and a relying party in authenticating a passcode, password or other information received from a client. The client in some embodiments may comprise a connected authentication token or other type of hardware or software authentication token.

21 Claims, 5 Drawing Sheets

(56) References Cited

OTHER PUBLICATIONS

Wang, Neng-Wen; Huang, Yueh-Min; "Users Authentication in Media Services by using One-Time Password Authentication Scheme", Third International Conference on Intelligent Information Hiding and Multimedia Signal Processing, Nov. 26-28, 2007, vol. 1, pp. 623-626.*

Gene Itkis, "Cryptographic Tamper Evidence," 10th ACM Conference on Computer and Communications Security (CCS), Oct. 2003, pp. 355-364.

Gene Itkis, "Forward Security, Adaptive Cryptography: Time Evolution," Handbook of Information Security, 2006, 27 pages.

A. Juels et al., "RSA Key Generation with Verifiable Randomness," 5th International Workshop on Practice and Theory in Public Key Cryptosystems: Public Key Cryptography (PKC), 2002, pp. 357-374.

* cited by examiner

SELF-REFRESHING DISTRIBUTED CRYPTOGRAPHY

FIELD

The field relates generally to cryptography, and more particularly to distributed cryptography.

BACKGROUND

Ordinary cryptographic primitives lack resilience to device compromise, in that an adversary that learns the secret key for a device such as a client or server can cryptographically impersonate the device without detection.

In conventional authentication systems, such issues may be addressed in the server context through the use of distributed cryptography arrangements. For example, in a typical distributed cryptography arrangement, a secret key is stored in a distributed manner across multiple servers instead of being stored in its entirety on a single server, as a basic defense against compromise of the single server. Efficient distributed cryptographic protocols are known for use in these and other settings, including protocols for operations such as digital signing, key generation, encryption and decryption.

Most of these known distributed cryptographic protocols rely on homomorphic properties inherent in public-key cryptographic primitives, which generally allow partial operations executed with individual key shares to be combined to achieve an operation with a complete secret key.

Nonetheless, deficiencies remain in current practice. For example, although the distributed cryptography arrangements described above can protect against adversarial compromise of a single server, a secret key stored in the client still remains vulnerable to compromise.

SUMMARY

Illustrative embodiments of the present invention provide improved distributed cryptography techniques that are particularly well-suited for use in public-key authentication applications. These embodiments generally involve implementing self-refreshing public-key cryptography modules in system entities such as clients, servers and relying parties.

Arrangements of this type can advantageously eliminate situations in which an adversary that learns the secret key for a given device such as a client or server can cryptographically impersonate the device without detection.

In one embodiment, a set of servers generates at least one challenge that is sent to a client. The servers receive from the client a response that includes a message generated as a function of the challenge. The response also includes a digital signature computed on the message using a secret key of a key pair generated for a current epoch. The client is authenticated based on indications from respective ones of the servers as to whether or not the received response is accepted as valid by that server.

In another embodiment, a set of servers is adapted for communication with a relying party. A passcode, password or other information is received from a client for authentication in a current epoch. Each server is configured to compute a message as a function of an identifier of the client, an identifier of the current epoch, and an indication as to whether or not the information received from the client is accepted by that server. Each server is further configured to compute a digital signature on its message using a secret key of a key pair of that server as generated for the current epoch, and to send the message and digital signature to the relying party as a signed message.

The relying party in this embodiment may be configured to receive signed messages from respective ones of the servers, to verify the digital signatures on the received messages using respective public keys of the key pairs of the servers as generated for the current epoch, and to accept the client as successfully authenticated if the digital signatures are valid and each of a threshold number of the servers indicates that the information received from the client is accepted.

The client in some embodiments may comprise a connected authentication token or other type of hardware or software authentication token.

Embodiments of the invention can be implemented in a wide variety of different cryptographic applications, including, for example, applications involving self-refreshing public-key digital signature primitives.

DETAILED DESCRIPTION

Illustrative embodiments of the present invention will be described herein with reference to exemplary communication systems and associated clients, servers and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

As will be described, the present invention in one or more illustrative embodiments provides techniques for self-refreshing distributed cryptography. Such embodiments may be implemented, for example, using authentication tokens, authentication servers and other types of cryptographic devices. These devices are examples of what are more generally referred to herein as "processing devices."

Figure 1:
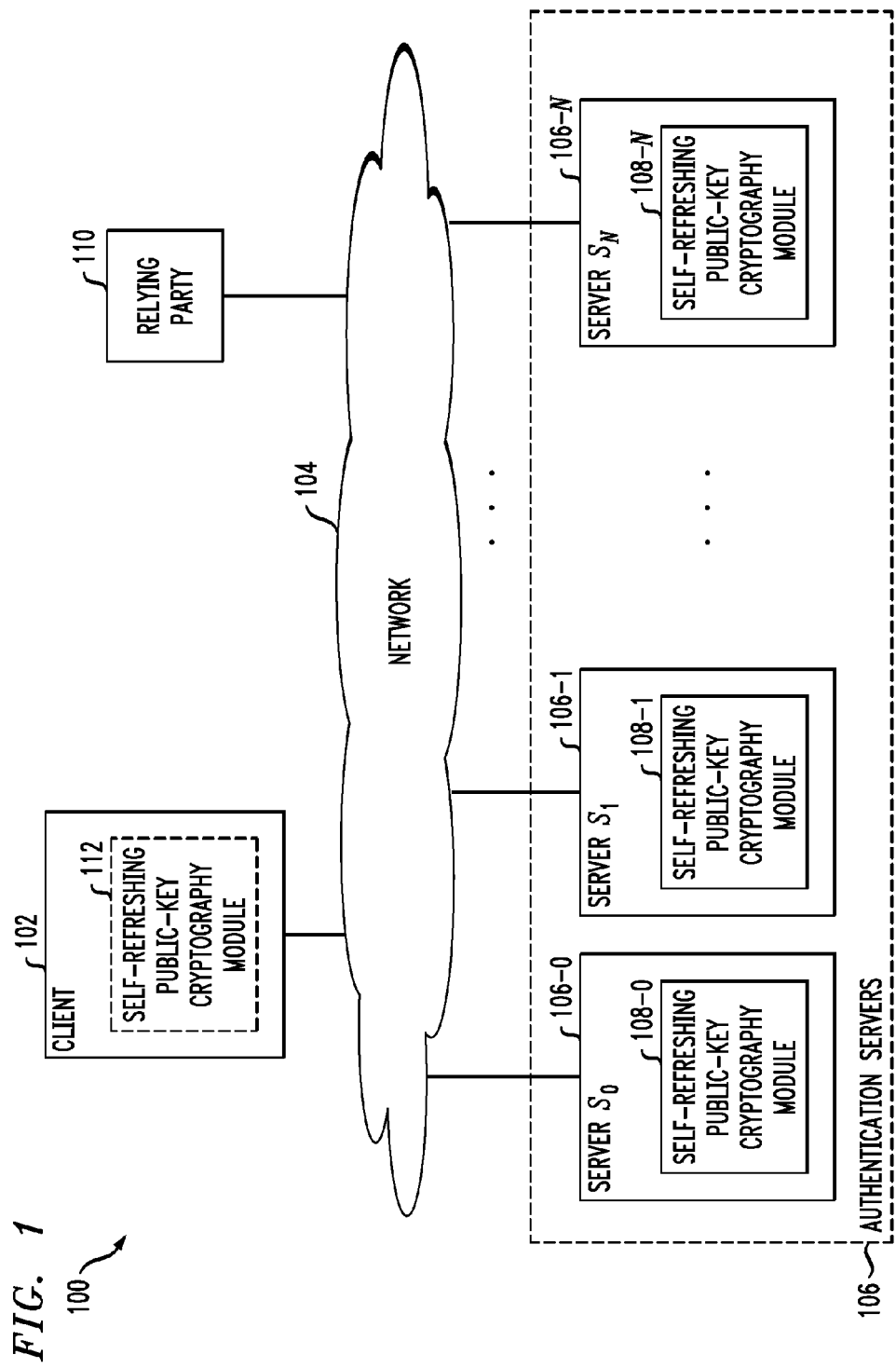
FIG. 1 is a block diagram of a communication system configured for self-refreshing distributed cryptography in an illustrative embodiment of the invention.

FIG. 1 shows a communication system 100 that incorporates functionality for self-refreshing distributed cryptography in an illustrative embodiment. The system 100 comprises a client 102 that communicates over a network 104 with a set of authentication servers 106. More particularly, the set of authentication servers 106 comprises a plurality of individual servers denoted 106-0, 106-1, . . . 106-N. It is assumed in the present embodiment that the client 102 is able to communicate over the network 104 with each of the servers 106, although other arrangements can be used in other embodiments.

For example, in some embodiments, communication between the client 102 and one or more of the servers 106 may flow through a controller that is part of an authentication system that includes the servers 106. Such a controller may be implemented at least in part within one or more of the servers.

Accordingly, the term "server" as used herein is intended to be broadly construed, so as to further encompass at least a portion of a controller or other similar entity of an authentication system. Also, communication between the client 102 and one or more of the servers 106 may flow through other ones of the servers 106.

The client 102 may comprise, for example, a mobile telephone, laptop computer, tablet computer or other user device having an associated hardware or software authentication token.

In such an arrangement, the authentication token may comprise a time-synchronous authentication token such as an RSA SecurID® user authentication token. The client 102 may be associated with a particular user, where "user" as the term is applied herein should be generally construed so as to encompass a human user or an associated hardware or software entity. Numerous alternative arrangements are possible.

The network 104 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The servers 106-0, 106-1, ... 106-N are also denoted in the figure as servers $S_0, S_1, \ldots S_N$, respectively. These servers comprise respective self-refreshing public-key cryptography modules 108-0, 108-1, ... 108-N that are utilized in implementing one or more distributed authentication processes, examples of which will be described below in conjunction with the flow diagrams of FIGS. 3 and 4.

Also coupled to the network 104 in the present embodiment is a relying party 110 that relies on an authentication result collectively produced using indicators generated by respective ones of the servers 106. The term "authentication result" as broadly used herein is intended to encompass, for example, a result produced by one of the servers 106 using inputs from the other servers, a result produced by the relying party 110 using inputs from the servers, as well other types of results, such as a result produced by a controller associated with the servers. In other embodiments, the relying party may comprise at least a portion of one or more of the servers 106. Also, the relying party 110 may itself be implemented as an additional server separate from the authentication servers 106.

The client 102 also includes a self-refreshing public-key cryptography module 112 that is utilized in implementing one or more distributed authentication processes in the communication system 100.

The self-refreshing public-key cryptography modules 108 and 112 are each assumed to implement one or more self-refreshing cryptographic primitives in which at least one secret key of the corresponding device is periodically updated. As a result, it is possible to detect or recover from a complete leakage of the secret key of the corresponding device. Such a leaked secret key known to the adversary will go stale, in the sense that the device generates and makes use of new secret keys over time.

In such primitives, time is divided into periods referred to as "epochs." An epoch can be event based, e.g., a counter incremented after each occurrence of a specified event, or time based, e.g., involving hourly or daily key updates. At the beginning of every epoch, a device updates its secret key, and signs a fresh public key using the updated secret key. It may then erase or otherwise discard the old secret key.

Self-refreshing cryptographic primitives utilized in some embodiments of the present invention may be based at least in part on tamper-evident digital signature techniques as described in G. Itkis, "Cryptographic tamper evidence," ACM CCS, pp. 355-364, New York, N.Y., USA, 2003. ACM, and G. Itkis, "Handbook of Information Security, chapter Forward Security: Adaptive Cryptography-Time Evolution, John Wiley and Sons, 2006, which are incorporated by reference herein. Primitives of this type are examples of what are more generally referred to herein as self-refreshing digital signing (SRDS) primitives. It should be understood that a wide variety of other types of self-refreshing public-key cryptographic primitives may be used in other embodiments.

A given SRDS primitive generally involves interaction between at least one signer and at least one verifier. In the embodiment to be described in conjunction with FIG. 3, the client 102 is the signer and the servers 106 are the verifiers, while in the embodiment to be described in conjunction with FIG. 4, the servers 106 are the signers and the relying party 110 is the verifier. Numerous alternative arrangements of signer and verifier entities may be used in other embodiments.

An exemplary SRDS primitive in certain illustrative embodiments herein is associated with an underlying public-key digital signature algorithm DS, which may have the following components:

KeyGen($1^l$): Takes as input a security parameter 1 denoting key length, and generates a digital signature key pair (SK, PK).

Sign(SK,m) Signs message m using secret key SK. $\Sigma_{SK}[m]$ denotes the corresponding signature.

Verify(PK,$\Sigma$,m): Verifies a signature $\Sigma$ on message m and generates as its output an "accept" or "reject" decision.

This is just one example of such an algorithm, and other types of public-key digital signature algorithms may be used in other embodiments.

The exemplary SRDS primitive may more particularly be implemented in the following manner. Let $C_t$ denote an individual certificate corresponding to the public key for epoch t, and Cart$_t$ denote an aggregate certificate $\{C_i\}_{i=1}^{t}$ for epoch t. Let $C_1$=Cert$_1$ denote a special root certificate for the signer.

FSInit($1^l$): Takes as input the security parameter 1 denoting key length. Generates a standard DS key pair (SK$_1$, PK$_1$) at the beginning of epoch 1. This is incorporated into Cert$_1$ which itself may be signed using DS or another digital signature technique or instead simply placed in trustworthy verifier storage.

FSUpdate(t,SK$_{t-1}$,$\{(C_i)\}$)i=$1^{t-1}$): Takes a certificate chain and current secret key SK$_{t-1}$ as input at the beginning of epoch t Invokes KeyGen($1^l$) to generate a fresh key pair (SK$_t$, PK$_t$). Computes $C_t=\Sigma_{SK_{t-1}}(PK_t)$ and outputs (SK$_t$,$\{(C_i)\}$)i=$1^t$).

FSSign(SK$_t$,m): Outputs signature $\Sigma_{SK_t}[m]$.

FSVerify($\Sigma$,m,Cert'$_t$,t): Run by a verifier. Takes as input a message/signature pair along with a corresponding asserted epoch and certificate. Outputs "accept" if: (1) The asserted epoch and corresponding certificate Cert'$_t$ are valid, and (2) $\Sigma$ is a valid signature with respect to PK$_t$ as asserted in Cert'$_t$. Note that the FSVerify function is a stateful algorithm, in that it retains information about the history of received certificates.

Portions of the above-described self-refreshing public-key cryptography functionality of respective signer and verifier entities are implemented as appropriate in a given embodiment using the cryptography modules 108 and 112 of servers 106 and client 102. Although not expressly shown in FIG. 1, a similar module may be implemented in relying party 110, for use in conjunction with execution of the FIG. 4 process.

The above-described FSVerify function may be adjusted in the following manner in order to facilitate implementation of authentication processes such as those described in conjunction with FIGS. 3 and 4. In order to detect the compromise of a secret key of a valid signer, the verifier detects a divergence in the certificate chains of the valid signer and the adversary. For this purpose, verifier retention of state is utilized. It is also valuable as a performance optimization, in that if a verifier holds, e.g., $Cert_{t-1}$ at time t, a signer need only furnish $C_t$ for the verifier to reconstruct $Cert_t$. Therefore, the FSVerify function can be adjusted such that the verifier retains only the freshest, valid certificate $C_{t*}$ for epoch t*. It verifies additional components with respect to $C_{t*}$, i.e., it treats the freshest valid certificate as a root certificate. A signer can keep track of its certificate transmissions to a verifier and send only certificates that are fresh, in the sense that they have not yet been sent to the verifier.

It is to be appreciated that the particular self-refreshing public-key cryptography functionality described above is exemplary only, and alternative primitives, functions, algorithms and other related functionality may be used in other embodiments.

The client 102, servers 106 and relying party 110 may be implemented as respective processing devices. A given such processing device may comprise, for example, a computer or other type of processing device configured to communicate with other such devices over the network 104. Each such processing device generally comprises at least one processor and an associated memory, and implements one or more functional modules for controlling certain features of the system 100.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. Such a memory and other memories disclosed herein may be viewed as examples of what are more generally referred to as "computer program products" storing executable computer program code.

Various elements of the system 100, such as the self-refreshing public-key cryptography modules 108 and 112, as well as other client or server components, may be implemented at least in part in the form of software that is stored in a memory of a processing device and executed by a processor of that processing device.

As noted above, the system 100 in the present embodiment implements one or more processes for self-refreshing distributed cryptography using the modules 108 and 112. Examples of such a process performed at least in part in conjunction with the client 102 authenticating to an authentication system comprising at least servers 106 and possible also relying party 110 will be described below, but it should be understood that numerous other types of processes may be used in other embodiments.

It is to be appreciated that the particular set of elements shown in FIG. 1 for providing self-refreshing distributed cryptography is presented by way of example, and in other embodiments additional or alternative elements may be used. Thus, another embodiment may include additional networks and additional sets of clients or servers.

Also, it may be assumed that there are ideal authenticated communication channels between system entities such as client 102, servers 106 and relying party 110. In practice, secure channels may be established using techniques such as secure sockets layer (SSL) or transport layer security (TLS). Such techniques are well known in the art and therefore not described in detail herein.

As mentioned previously, various elements of system 100 such as clients and servers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices. Examples of such processing platforms that may form at least a portion of the system 100 will be described below in conjunction with FIGS. 5 and 6.

As noted above, in one or more of illustrative embodiments, the client 102 may comprise a hardware or software authentication token and the servers 106 may comprise authentication servers. An exemplary arrangement of this type will now be described in greater detail with reference to FIG. 2.

Figure 2:
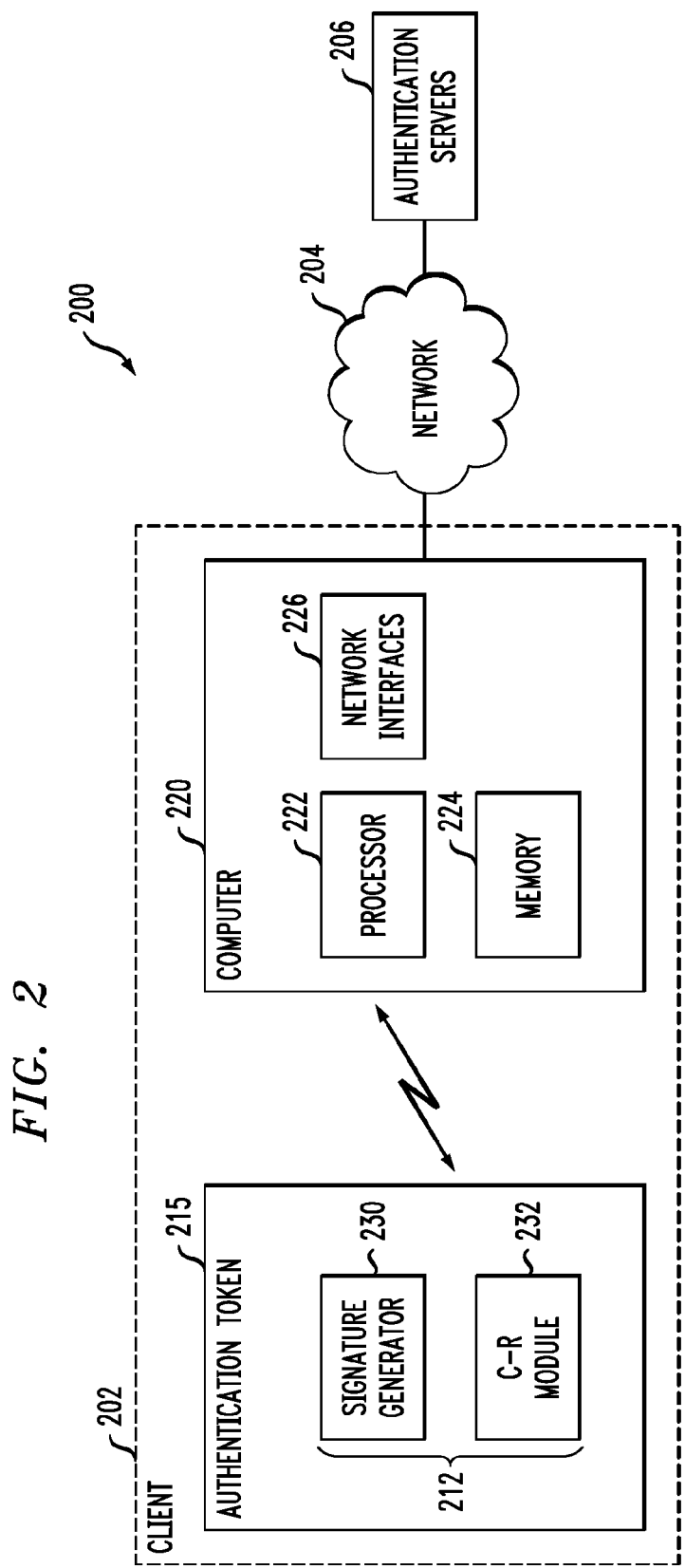
FIG. 2 illustrates one possible implementation of the FIG. 1 system using a client comprising an authentication token and an associated computer.

FIG. 2 shows an authentication system 200 corresponding generally to an implementation of communication system 100 in which a client 202 communicates over a network 204 with authentication servers 206. The client 202 is configured to include a self-refreshing cryptography module 212 that is part of an authentication token 215. Information from an authentication token 215 is sent to the authentication servers 206 via network 204 and a host device that illustratively comprises a computer 220. The term "client" as used herein is intended to be broadly construed so as to encompass, for example, authentication token 215 alone or in combination with at least a portion of the computer 220. In other embodiments, such as those involving use of software tokens, the client 202 may comprise only computer 220, or another type of processing device, such as a mobile telephone, with the authentication token 215 implemented as a software component of the processing device rather than as a separate device as shown in FIG. 2.

The authentication token 215 is typically configured to generate one-time passcodes (OTPs) or other types of passcodes that are utilized by the client 202 to authenticate to the servers 206. Such passcodes may be presented to a user via a display of the token, such that the user can manually enter a given passcode into a user interface of the computer 220. Alternatively, a given passcode may be communicated directly from the authentication token 215 via a wired or wireless connection between the token and the computer 220. By way of example, the authentication token may be configured to communicate with the computer 220 via a wired connection such as a USB interface, or via a wireless connection such as a Bluetooth, NFC or IEEE 802.11 connection.

The authentication token 215 may be, for example, a time-synchronous authentication token, an event-synchronous authentication token, a challenge-response token, a hash-chain token, or a hybrid token that incorporates multiple such capabilities, such as a hybrid time-synchronous and event-synchronous token. A given authentication token may be a connected token or a disconnected token, or one capable of operating in both connected and disconnected modes. The disclosed techniques can be adapted in a straightforward manner for use with other types of cryptographic devices.

As a more particular example, the authentication token 215 may comprise a time-synchronous authentication token such as the above-noted RSA SecurID® user authentication token, suitably modified as disclosed herein.

The computer 220 generally comprises a processor 222, a memory 224, and one or more network interfaces 226 which allow the computer to communicate with the authentication servers 206 over the network 204.

The self-refreshing public-key cryptography module 212 of the authentication token 215 in the present embodiment further comprises a digital signature generator 230 and a challenge-response module 232. These modules are utilized to implement self-refreshing public-key cryptography functionality of the type described above.

Although the self-refreshing public-key cryptography module 212 in this embodiment is implemented in authentication token 215, in other embodiments the module 212 may be implemented at least in part in another system element, such as in the computer 220. As noted above, the token 215 and computer 220 may be collectively viewed as an example of a "cryptographic device" as that term is broadly used herein.

The host device illustratively implemented as computer 220 in the FIG. 2 embodiment may comprise a desktop or portable personal computer, mobile telephone, personal digital assistant (PDA), wireless email device, workstation, kiosk, television set-top box, game console, or any other processing device that provides an interface between authentication token 215 and the authentication servers 206.

It was indicated previously that a given authentication token need not take the form of a stand-alone hardware token. For example, such a device may be incorporated into another processing device, such as a computer, mobile telephone, etc. In one such implementation, the host device and the authentication token may be combined into a single processing device that communicates with the authentication server.

In the system 200, the authentication servers 206 are configured as back-end authentication servers, in that they communicate with computer 220 over a network, but other types of authentication servers may be used.

A wide variety of authentication processes may be implemented using an authentication token, a host device and a set of multiple authentication servers arranged as shown in FIG. 2. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

It is to be appreciated that a given embodiment of the system 200 may include multiple instances of an authentication token, a host device and a set of authentication servers, and possibly other system components, although only single instances of illustrative examples of such components are shown in the simplified system diagram of FIG. 2 for clarity of illustration. Also, as indicated previously, other embodiments may combine certain system elements, such as an authentication token and a host device. It is also possible to eliminate, modify or replace other system elements. For example, authentication token 215 may communicate directly with authentication servers 206, rather than via other elements such as computer 220 and network 204.

The operation of the system 100 will now be described in greater detail with reference to the flow diagrams of FIGS. 3 and 4, which illustrate sets of operations performed in the system 100 as part of exemplary distributed authentication processes in illustrative embodiments. The disclosed operations can be adapted in a straightforward manner for implementation in the system 200, which may be viewed as one possible token-based implementation of the system 100.

Thus, references below to client 102 may alternatively be viewed as referring to client 202 and references to servers 106 may alternatively be viewed as referring to authentication servers 206. These processes may be adapted in a straightforward manner for use in numerous other system configurations.

Figure 3:
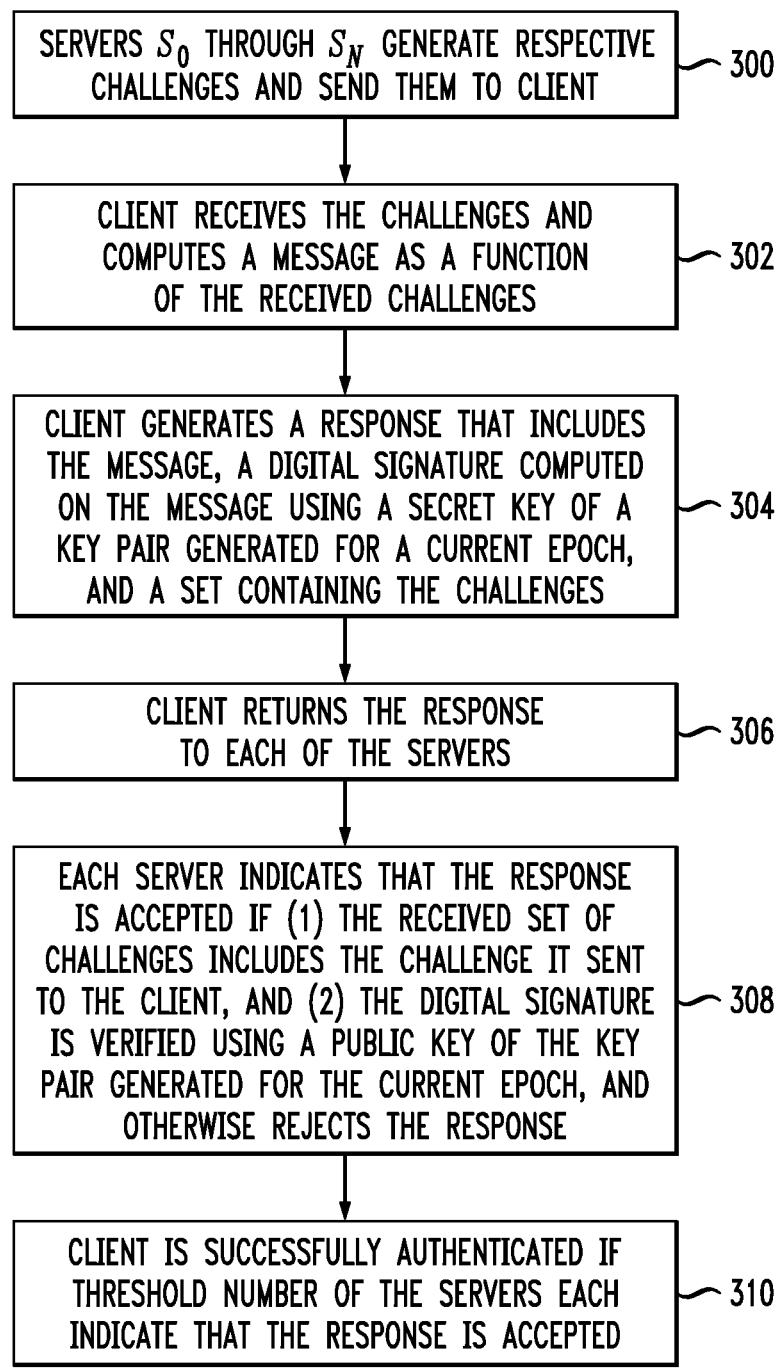
FIGS. 3 and 4 are flow diagrams illustrating exemplary distributed authentication processes performed in the FIG. 1 system.
Figure 4:
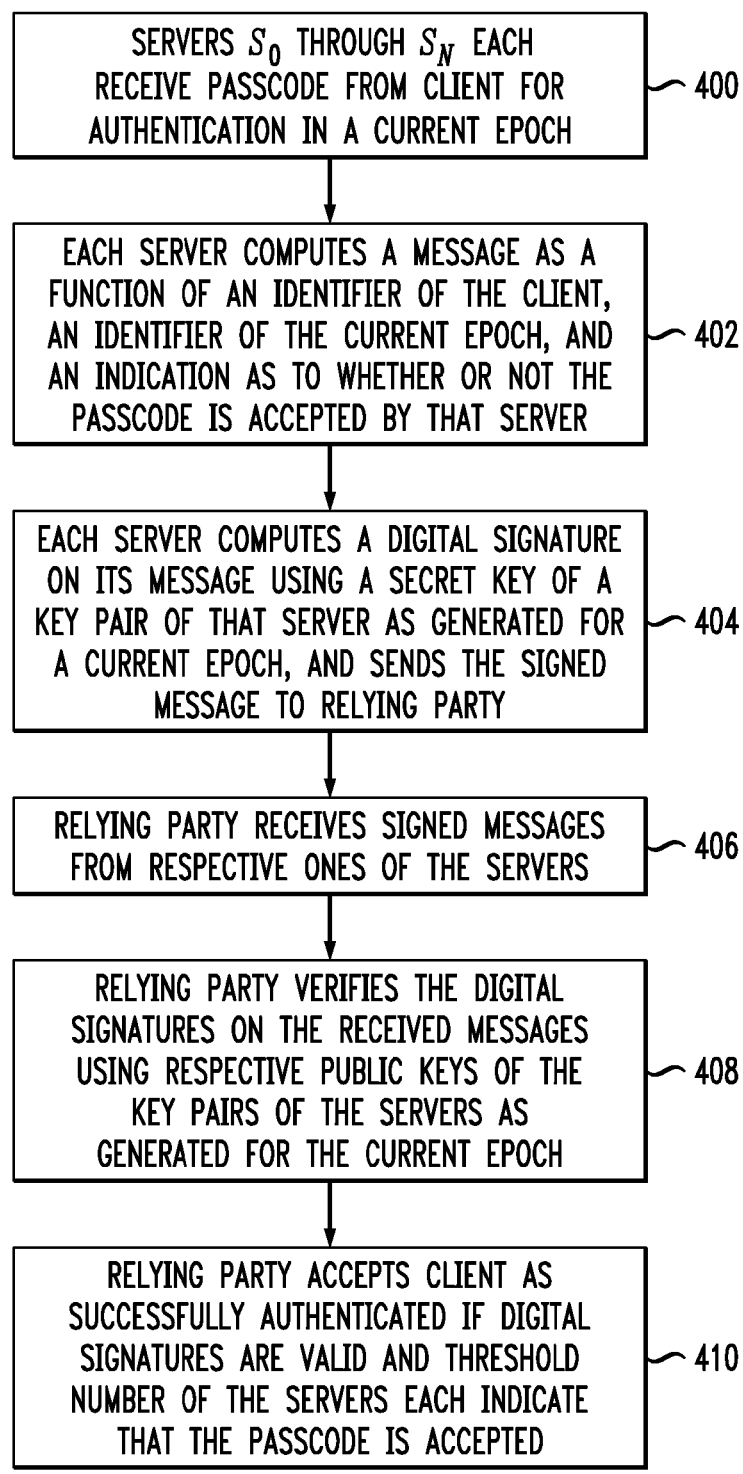

Also, the exemplary processes to be described in conjunction with FIGS. 3 and 4 may be viewed as providing improvements in corresponding distributed credential protection (DCP) applications, although the disclosed processes can be utilized in a wide variety of other applications.

In the DCP context, the disclosed techniques can provide automated support for proactive secret splitting. For example, an exemplary DCP arrangement may proactively rerandomize shares of stored secrets. This may also involve refreshing the digital signatures employed by servers to attest to the validity of an authentication attempt. As another example, advanced challenge-response authentication can be used to provide threshold-based verification as well as detection of key compromise in clients. Such arrangements are particularly useful in the case of connected authentication tokens.

Referring initially to FIG. 3, the process as shown includes steps 300 through 310. Steps 302, 304 and 306 are assumed to be performed by the client 102 utilizing its self-refreshing public-key cryptography module 112. Steps 300, 308 and 310 are performed by the servers 106 using their self-refreshing public-key cryptography modules 108. It is to be appreciated that in other embodiments one or more such steps may be implemented at least in part by other system elements.

In step 300, servers $S_0$ through $S_N$ generate respective challenges and send them to the client 102. In other embodiments, the servers may collaborate to generate a single challenge that is sent to the client, with the single challenge being generated based on inputs from respective ones of the servers. For example, the servers could collaborate to compute a combined, joint random value C that serves as their combined challenge.

In step 302, the client 102 receives the challenges and computes a message as a function of the received challenges.

In step 304, the client 102 generates a response that includes the message, a digital signature computed on the message using a secret key of a key pair generated for a current epoch, and a set containing the challenges. In an embodiment in which a single challenge is used as described above, the message would not include a set of multiple challenges.

In step 306, the client 102 returns the response to each of the servers 106.

In step 308, each server 106 indicates that the response is accepted if (1) the received set of challenges includes the challenge it sent to the client 102, and (2) the digital signature is verified using a public key of the key pair generated for the current epoch, and otherwise rejects the response.

In step 310, the client 102 is successfully authenticated if a threshold number of the servers 106 each indicate that the response is accepted. Thus, the client 102 in the present embodiment is authenticated based on indications from respective ones of the servers $S_0, S_1, \ldots S_N$ as to whether or not the response received from the client is accepted. For example, the received response may be accepted as a valid response only if each of a specified threshold number of the servers indicates that the received response is accepted. This determination may be made in one of the servers using inputs received from the other servers, or in another system element such as the relying party 110 or a controller. The specified threshold number of the servers may be all of the servers $S_0$, $S_1, \ldots S_N$. Alternatively, the specified threshold number may be fewer than all but more than one of those servers.

As a more particular example of the authentication process illustrated in FIG. 3, consider a connected authentication token that authenticates to k verifiers corresponding to respective ones of the servers 106. Verifier j generates a random challenge $c_j$, e.g., a random 256-bit string, and sends it to the token. The token then computes $$c = h(c_1 \| c_2, \ldots, c_{k-1} \| c_k; s),$$

where s identifies the corresponding session or transaction and $h(\bullet)$ is a hash function, and returns a response $$R = \left( c, C = \{c_j\}_{j=1}^k, \sigma = \sum_{SK} [c] \right)$$

to all the verifiers. Verifier j outputs "accept" if $c_j \in C$ and verify(PK,$\sigma$,c)=accept.

This general form of public-key-based authentication may be strengthened through the use of an SRDS primitive to generate (SK,PK). The effect of such strengthening is resilience to token compromise, in that an adversary possessing a secret key of the token cannot authenticate once the token key has evolved and been transmitted to the verifier. If an adversary does successfully authenticate, the compromise will nonetheless be detectable once the token transmits a certificate with a key for a given epoch differing from that submitted by the adversary.

An active adversary, i.e., one capable of modifying token or server software, can corrupt an SRDS implementation by substituting a pseudorandom number generator with a seed known to the adversary for a good source of randomness. The adversary can then generate future secret keys without further interaction with the token or server.

As a countermeasure, tokens or servers might make use of additional secret keys generated by external, trusted entities. For example, in a two-server (2,2)-threshold variant of DCP, each server might generate a second secret key on behalf of the other server, for use in addition to its self-generated SRDS key. Servers then sign using both keys.

More generally, the proposed countermeasure is for the particular device of interest, token or server, to receive secret values on a periodic basis from a trusted source. These secret values are incorporated into its signatures. The secret values can themselves be digital signing keys, but could also be static values. The latter values are also considered examples of "secret keys" as that term is broadly used herein.

An alternative is key generation with verifiable randomness, as described in A. Juels and J. Guajardo, "RSA Key Generation with Verifiable Randomness," PKC, pp. 357-374, 2002, which is incorporated by reference herein.

It should be noted that the ability to generate signing keys that are unknown to an adversary does not prevent successful active attack. For example, an adversary can always modify server software to output "accept" as desired. But ensuring sound keys is still valuable, in that while the software of a server can be easily set to a known, clean state common to all verifiers, keys are server-specific. Consequently, key generation and distribution can be a resource-intensive process.

FIG. 4 shows a set of operations performed by servers 106 and relying party 110 responsive to receipt of a passcode from client 102 as part of another exemplary distributed authentication process in an illustrative embodiment.

The process as shown includes steps 400 through 410. Steps 400, 402 and 404 are assumed to be performed by the servers 106 using their self-refreshing public-key cryptography modules 108. Steps 406, 408 and 410 are assumed to be performed by the relying party 110. Again, it is to be appreciated that in other embodiments one or more such steps may be implemented at least in part by other system elements.

In step 400, servers $S_0$ through $S_N$ each receive the same passcode from client 102 for authentication in a current epoch. The passcode may comprise, for example, an OTP generated by a hardware or software authentication token such as authentication token 215. Although a passcode is used in this embodiment, other embodiments may utilize passwords or other types of information that may be submitted by client 102 for authentication of that client in the current epoch.

In step 402, each server computes a message as a function of an identifier of the client, an identifier of the current epoch, and an indication as to whether or not the passcode is accepted by that server.

In step 404, each server computes a digital signature on its message using a secret key of a key pair of that server as generated for a current epoch, and sends the signed message to relying party 110.

In step 406, the relying party 110 receives signed messages from respective ones of the servers 106.

In step 408, the relying party 110 verifies the digital signatures on the received messages using respective public keys of the key pairs of the servers 106 as generated for the current epoch.

In step 410, the relying party 110 accepts the client 102 as successfully authenticated if the digital signatures are valid and threshold number of the servers 106 each indicate that the passcode is accepted.

Thus, the client 102 in the present embodiment is authenticated based on indications from respective ones of the servers $S_0, S_1, \ldots S_N$ as to whether or not the passcode submitted by the client 102 is accepted. This authentication determination is assumed to be made by the relying party 110, but alternatively may be made at least in part by one or more other system elements, such as one of the servers 106 using inputs received from the other servers. As in the FIG. 3 embodiment, the specified threshold number of the servers may be all of the servers, or fewer than all but more than one of those servers.

As a more particular example of the authentication process illustrated in FIG. 4, consider a two-server DCP password-verification embodiment with two servers $S_0$ and $S_1$. On submission of a correct password for user U at a given time t, server $S_0$ will produce a signature $\Sigma_{S_0}$ on a message of the form (U,t,accept) using a secret key $SK_{S_0}$. The server $S_1$ will similarly produce a signature $\Sigma_{S_1}$ on such a message using secret key $SK_{S_1}$. The relying party accepts the authentication as valid if both signatures are valid.

In this example, an attacker that learns both $SK_{S_0}$ and $SK_{S_1}$ can forge authentication attestations at will, without compromising passcodes, passwords or other system secrets. Consequently, to achieve full security against a mobile adversary that can compromise both servers but in different epochs, the signing keys of the servers are refreshed using the above-described SRDS functionality.

Active corruption of randomness on servers is possible as in the connected token case described previously. A similar countermeasure applies, in that servers can periodically reprovision tokens with additional key pairs.

Servers in this exemplary setting do not store any secret keys. To successfully impersonate a token or its associated user, an attacker must therefore compromise keys in the token itself or actively compromise k servers, i.e., modify their software to output invalid accept messages during a bogus authentication attempt by the adversary.

The particular processing operations and other system functionality described in conjunction with the flow diagrams of FIGS. 3 and 4 are presented by way of illustrative example only, and should not be construed as limiting the scope of the invention in any way. Alternative embodiments can use other types of processing operations for self-refreshing distributed cryptography. For example, the ordering of the process steps may be varied in other embodiments, or certain steps may be performed concurrently with one another rather than serially.

It should also be understood that distributed cryptographic functionality such as that described in conjunction with FIGS. 1 through 4 can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The embodiments described in conjunction with FIGS. 1 through 4 can provide a number of significant advantages relative to conventional practice. For example, these embodiments can advantageously eliminate situations in which an adversary that learns the secret key for a given device such as a client or server can cryptographically impersonate the device without detection. More particularly, certain of the disclosed embodiments utilize SRDS primitives in a client authentication process that permits detection of key compromise and may be readily adapted to a threshold setting. Others provide a valuable complement to proactive secret key refresh, ensuring security against an adversary that attempts to compromise attestation-signing keys of multiple servers rather than stored secret keys themselves.

As indicated previously, the communication system 100 may be implemented using one or more processing platforms. One or more of the processing modules or other components of system 100 may therefore each run on a computer, storage device or other processing platform element. A given such element may be viewed as an example of what is more generally referred to herein as a "processing device."

Figure 5:
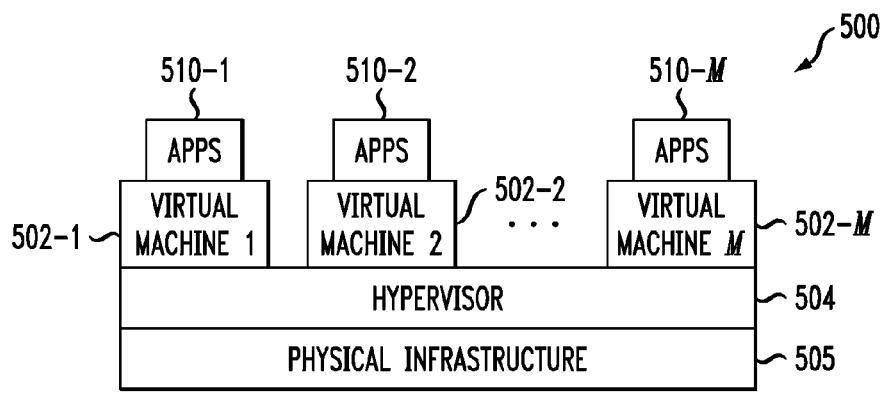
FIGS. 5 and 6 show examples of processing platforms that may be utilized to implement at least a portion of the communication system of FIG. 1.

Referring now to FIG. 5, one possible processing platform that may be used to implement at least a portion of one or more embodiments of the invention comprises cloud infrastructure 500. The cloud infrastructure 500 in this exemplary processing platform comprises virtual machines (VMs) 502-1, 502-2, . . . 502-M implemented using a hypervisor 504. The hypervisor 504 runs on physical infrastructure 505. The cloud infrastructure 500 further comprises sets of applications 510-1, 510-2, . . . 510-M running on respective ones of the virtual machines 502-1, 502-2, . . . 502-M under the control of the hypervisor 504.

The cloud infrastructure 500 may encompass the entire system 100 or only portions of that system, such as one or more of client 102, servers 106 and relying party 110 in the system 100. Similar arrangements of cloud infrastructure may be used to implement at least a portion of the system 200 of FIG. 2.

Although only a single hypervisor 504 is shown in the embodiment of FIG. 5, the system 100 or 200 may of course include multiple hypervisors each providing a set of virtual machines using at least one underlying physical machine.

An example of a commercially available hypervisor platform that may be used to implement hypervisor 504 and possibly other portions of system 100 or 200 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of system 100 or 200.

Figure 6:
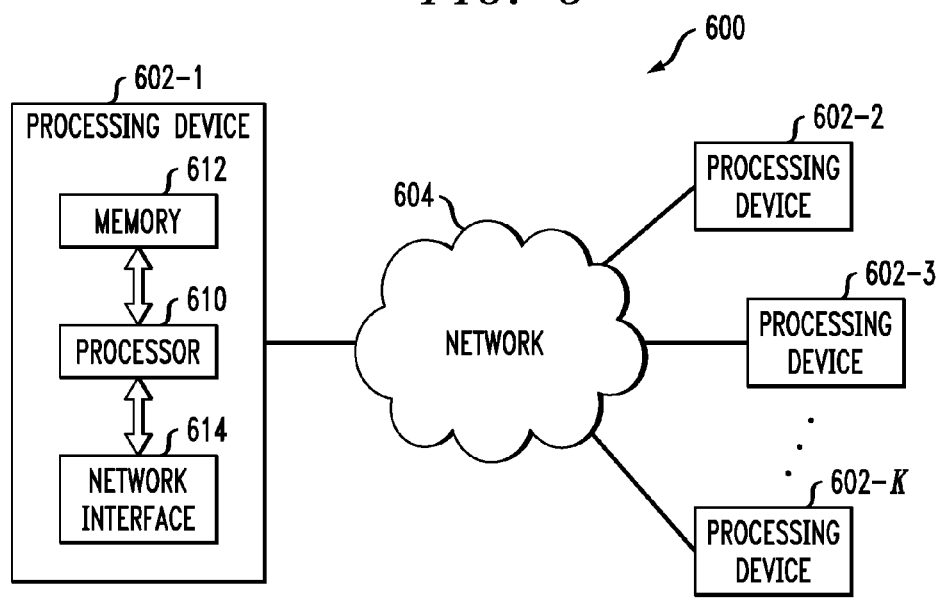

Another example of a processing platform is processing platform 600 shown in FIG. 6. The processing platform 600 in this embodiment comprises at least a portion of the system 100 or 200 and includes a plurality of processing devices, denoted 602-1, 602-2, 602-3, . . . 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "computer program product" having executable computer program code embodied therein, may comprise RAM, ROM or other types of memory, in any combination.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 or 200 may include additional or alternative processing platforms, as well as numerous distinct processing platforms in any combination, with each such platform comprising one or more computers, storage devices or other processing devices.

Multiple elements of system 100 or 200 may be collectively implemented on a common processing platform of the type shown in FIG. 5 or 6, or each such element may be implemented on a separate processing platform.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from self-refreshing distributed cryptography as disclosed herein. Also, the particular configuration of communication system and processing device elements shown in FIGS. 1-6, and the associated authentication processes, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
receiving in each of a plurality of servers same authentication information from a client for authentication in a current epoch, the authentication information being generated at the client for the current epoch;
each of the plurality of servers computing a message as a function of an identifier of the client, an identifier of the current epoch, and an indication as to whether or not the authentication information received from the client is accepted by that server; and
each of the plurality of servers computing a digital signature on its message using a secret key of a key pair of that server as generated for the current epoch, and sending the message and digital signature to a relying party as a signed message;
wherein the client is authenticated by the relying party based on the signed messages generated by the respective servers;
wherein the relying party:
receives the signed messages from respective ones of the servers;
verifies the digital signatures on the received messages using respective public keys of the key pairs of the servers as generated for the current epoch; and
accepts the client as successfully authenticated if the digital signatures are valid and each of a threshold number of the servers indicates that the authentication information received from the client is accepted, the threshold number being more than one of the servers; and
wherein the servers are implemented using at least one processing device comprising a processor coupled to a memory.

2. The method of claim 1 wherein the authentication information received from the client comprises at least one of a passcode and a password.

3. The method of claim 1 wherein the threshold number of the servers comprises all of the servers in the plurality of servers.

4. The method of claim 1 wherein the relying party comprises a controller of an authentication system that includes the plurality of servers.

5. The method of claim 1 wherein at least a subset of the servers receive the authentication information from the client at least in part via the relying party.

6. The method of claim 1 wherein the authentication information received from the client comprises a passcode generated by an authentication token.

7. The method of claim 1 wherein the secret keys of each of the plurality of servers are refreshed using self-refreshing digital signing functionality.

8. A computer program product comprising a non-transitory processor-readable storage medium having embodied therein one or more software programs, wherein the one or more software programs when executed by at least one processing device cause:
each of a plurality of servers to receive therein same authentication information from a client for authentication in a current epoch, the authentication information being generated at the client for the current epoch;
each of the plurality of servers to compute a message as a function of an identifier of the client, an identifier of the current epoch, and an indication as to whether or not the authentication information received from the client is accepted by that server; and
each of the plurality of servers to compute a digital signature on its message using a secret key of a key pair of that server as generated for the current epoch, and to send the message and digital signature to a relying party as a signed message;
wherein the client is authenticated by the relying party based on the signed messages generated by the respective servers; and
wherein the relying party:
receives the signed messages from respective ones of the servers;
verifies the digital signatures on the received messages using respective public keys of the key pairs of the servers as generated for the current epoch; and
accepts the client as successfully authenticated if the digital signatures are valid and each of a threshold number of the servers indicates that the authentication information received from the client is accepted, the threshold number being more than one of the servers.

9. The computer program product of claim 8 wherein the authentication information received from the client comprises at least one of a passcode and a password.

10. The computer program product of claim 8 wherein the threshold number of the servers comprises all of the servers in the plurality of servers.

11. The computer program product of claim 8 wherein the authentication information received from the client comprises a passcode generated by an authentication token.

12. The computer program product of claim 8 wherein the secret keys of each of the plurality of servers are refreshed using self-refreshing digital signing functionality.

13. The computer program product of claim 8 wherein the relying party comprises a controller of an authentication system that includes the plurality of servers.

14. The computer program product of claim 8 wherein at least a subset of the servers receive the authentication information from the client at least in part via the relying party.

15. An apparatus comprising:
a plurality of servers adapted for communication with a relying party;
wherein same authentication information is received in each of the plurality of servers from a client for authentication in a current epoch, the authentication information being generated at the client for the current epoch;
each server being configured:
to compute a message as a function of an identifier of the client, an identifier of the current epoch, and an indication as to whether or not the authentication information received from the client is accepted by that server;
to compute a digital signature on its message using a secret key of a key pair of that server as generated for the current epoch; and
to send the message and digital signature to the relying party as a signed message;
the relying party being configured:
to receive the signed messages from respective ones of the servers;
to verify the digital signatures on the received messages using respective public keys of the key pairs of the servers as generated for the current epoch; and
to accept the client as successfully authenticated if the digital signatures are valid and each of a threshold number of the servers indicates that the authentication information received from the client is accepted, the threshold number being more than one of the servers;
wherein the servers are implemented using at least one processing device comprising a processor coupled to a memory.

16. The apparatus of claim 15 wherein the relying party comprises a controller of an authentication system that includes the plurality of servers.

17. The apparatus of claim 15 wherein at least a subset of the servers receive the authentication information from the client at least in part via the relying party.

18. The apparatus of claim 15 wherein the authentication information received from the client comprises at least one of a passcode and a password.

19. The apparatus of claim 15 wherein the threshold number of the servers comprises all of the servers in the plurality of servers.

20. The apparatus of claim 15 wherein the authentication information received from the client comprises a passcode generated by an authentication token.

21. The apparatus of claim 15 wherein the secret keys of each of the plurality of servers are refreshed using self-refreshing digital signing functionality.

* * * * *